(12) United States Patent
Nguyen

(10) Patent No.: US 8,403,298 B2
(45) Date of Patent: Mar. 26, 2013

(54) GATE VALVE WITH INTEGRATED SUPPORT MEMBERS

(75) Inventor: Viet Nguyen, Reno, NV (US)

(73) Assignee: Pentair Valves & Controls US LP, Houston, TX (US)

(*) Notice: Subject to any disclaimer, the term of this patent is extended or adjusted under 35 U.S.C. 154(b) by 375 days.

(21) Appl. No.: 12/702,500

(22) Filed: Feb. 9, 2010

(65) Prior Publication Data

US 2010/0200793 A1 Aug. 12, 2010

Related U.S. Application Data

(60) Provisional application No. 61/151,340, filed on Feb. 10, 2009.

(51) Int. Cl.
*F16K 3/00* (2006.01)

(52) U.S. Cl. .......................... 251/327; 251/328; 251/239

(58) Field of Classification Search .................. 251/326, 251/327, 328, 329
See application file for complete search history.

(56) References Cited

U.S. PATENT DOCUMENTS

| | | | |
|---|---|---|---|
| 3,189,319 A * | 6/1965 | Bredtschneider | 251/328 |
| 4,765,361 A | 8/1988 | Clifford | |
| 4,846,442 A * | 7/1989 | Clarkson et al. | 251/328 |
| 5,338,006 A | 8/1994 | McCutcheon et al. | |
| 5,413,140 A | 5/1995 | Kimpel et al. | |
| 5,890,700 A | 4/1999 | Clarkson et al. | |
| 6,422,535 B1 * | 7/2002 | Stone et al. | 251/327 |
| 7,458,559 B2 * | 12/2008 | Blenkush | 251/328 |
| 7,992,840 B2 * | 8/2011 | Cain et al. | 251/328 |
| 8,016,265 B2 * | 9/2011 | Weide | 251/328 |

* cited by examiner

Primary Examiner — John K Fristoe, Jr.
Assistant Examiner — Hailey K Do

(57) ABSTRACT

A gate valve has support members that are attached to a main body structure of the gate valve adjacent to the valve gate opening. These support members are affixed on both sides of the valve gate opening radially around a gate sleeve.

16 Claims, 9 Drawing Sheets

SECTION A-A

SECTION B-B

DETAIL K

SECTION D-D

SECTION C-C

GATE VALVE WITH INTEGRATED SUPPORT MEMBERS

TECHNICAL FIELD

The present invention relates to gate valves having integrated support members along the periphery of the passage within the main body structure of the valve to decrease degradation of an elastomer seal.

BACKGROUND OF THE INVENTION

Gate valves are used to control the flow of various fluids carried inside tubular conduits or pipes. A gate valve typically includes a main body structure with a passage positioned between and coupling a pair axially-aligned conduits that are bolted to opposite sides of the main body structure. A flat, fluid-impermeable gate with a pair of opposed, substantially planar faces is slidable into the passage through a slot in the main body structure to selectively occlude the passage and thereby close the valve.

Gate valves that are used to control the flow of fluids include a seal between the gate and the main body structure to prevent the fluid from leaking, either from the valve or across it when closed. For fluids that include a mixture of solids, referred to as a slurry, an adequate seal between the gate and the main body structure can be difficult to achieve. Slurries arise in many harsh industrial environments, such as wood pulp processing and paper manufacturing, various types of mining including coal and phosphates, and bottom ash removal systems for power station smokestack scrubbers. The solids in such slurries can clog, coat, or damage a seal in many gate valves and thereby allow the fluid to leak.

One bidirectional gate valve seal, described in U.S. Pat. No. 4,846,442 of Clarkson et al., includes a pair of opposed solid resilient sleeve units that compressibly engage each other when the valve is open and engage opposite sides of the gate when the valve is closed. A stiffening ring bonded to each sleeve unit engages a rigid locking ring to hold the sleeve unit in place.

Such a gate valve seal suffers from several disadvantages. The solid resilient sleeve units can be difficult to displace when closing the valve because the design does not include a way to eliminate overcompression of the sleeve from the flange-raised face surfaces of the mating conduit, thereby making the valve difficult to operate. Moreover, pressure against the gate in a valve closed position can displace the resilient sleeve unit on the downstream side and allow a leak between the gate and the upstream resilient sleeve unit.

One methodology used to overcome these problems is found in U.S. Pat. No. 5,338,006 of McCutcheon et al., includes a seal member having a resilient, annular, elastomer sleeve and a substantially rigid annular hub that are press fit together. However, this design requires special tooling and molding of the hub.

There is a need in the art to provide a support member to the operation of the gate valve to decrease the degradation of the elastomer sleeve. The present invention addresses this and other needs.

SUMMARY OF THE INVENTION

The present invention includes a gate valve having a main body structure with first and second sides defining a passage therethrough, a gate transversably positioned within the passage, suitable for occluding fluid flow therethrough, wherein the gate when positioned within the passage defines has opposing sides that each have a peripheral margin, moving means coupled to the gate for moving the gate along a given axis to selectively occlude the passage, a first set of rigid support members affixed to the main body structure at the periphery of the passage on the first side of the gate, the first set of rigid support members extending from the main body structure towards the transversal path of the gate, wherein the surface of the first set of rigid support members closest to the gate extends beyond the surface of the main body structure, a second set of rigid support members affixed to the main body structure at the periphery of the passage on the second side of the gate, the second set of rigid support members extending from the main body structure towards the transversal path of the gate, wherein the surface of the second set of rigid support members closest to the gate extends beyond the surface of the main body structure, and first and second elastomer sleeves, each elastomer sleeve having a continuous lip section, the lip sections of the first and second sleeves engaging the peripheral margins of the gate when it occludes the passage and engaging each other otherwise, whereby the rigid support members facilitate displacement of the elastomer sleeves when they engage the gate and prevent overcompression of the elastomer sleeves.

DETAILED DESCRIPTION OF A PREFERRED EMBODIMENT

Figure 1:
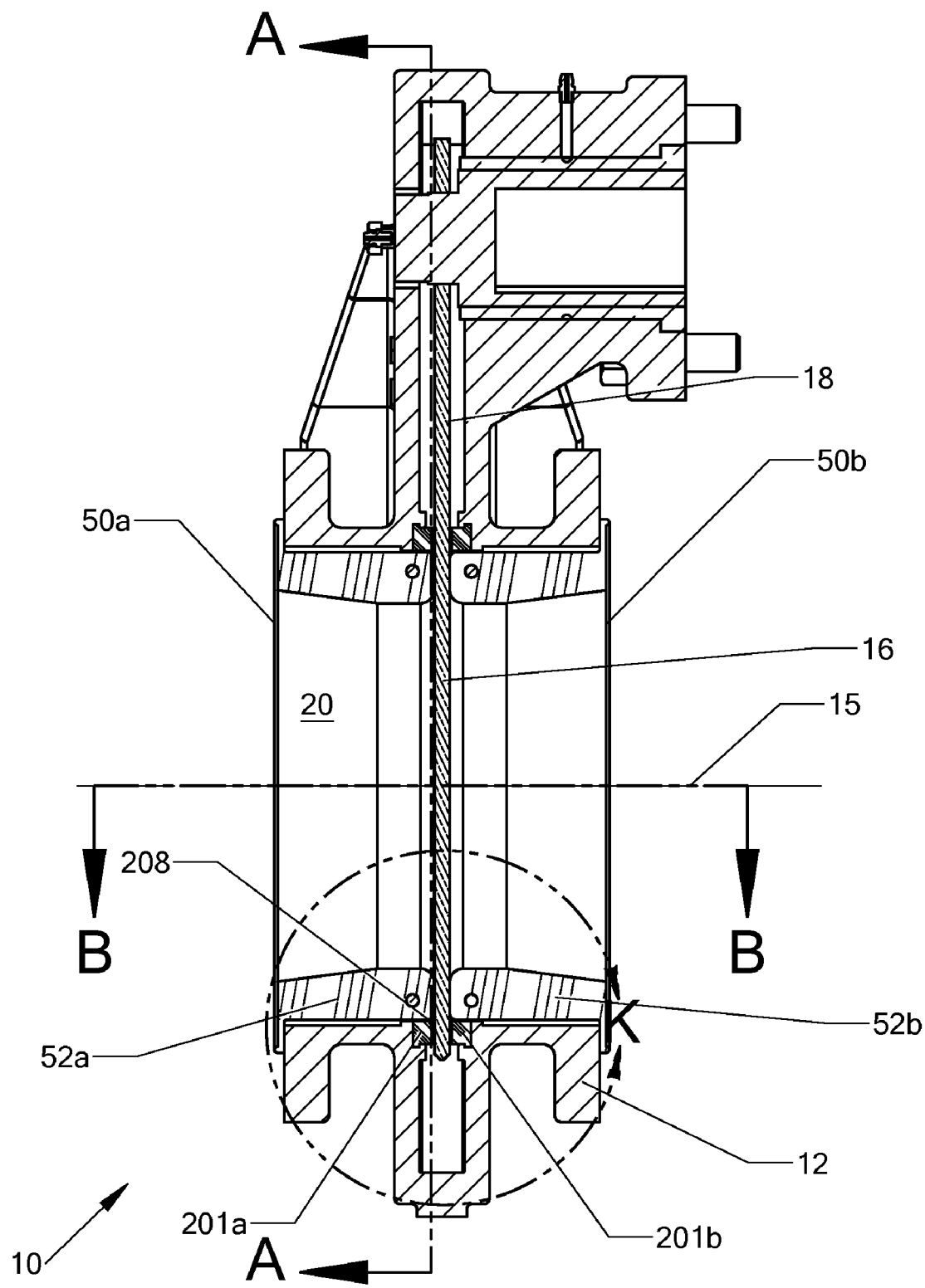
FIG. 1 is a section view of a rotary gate valve employing a support member of the present invention.
Figure 2:
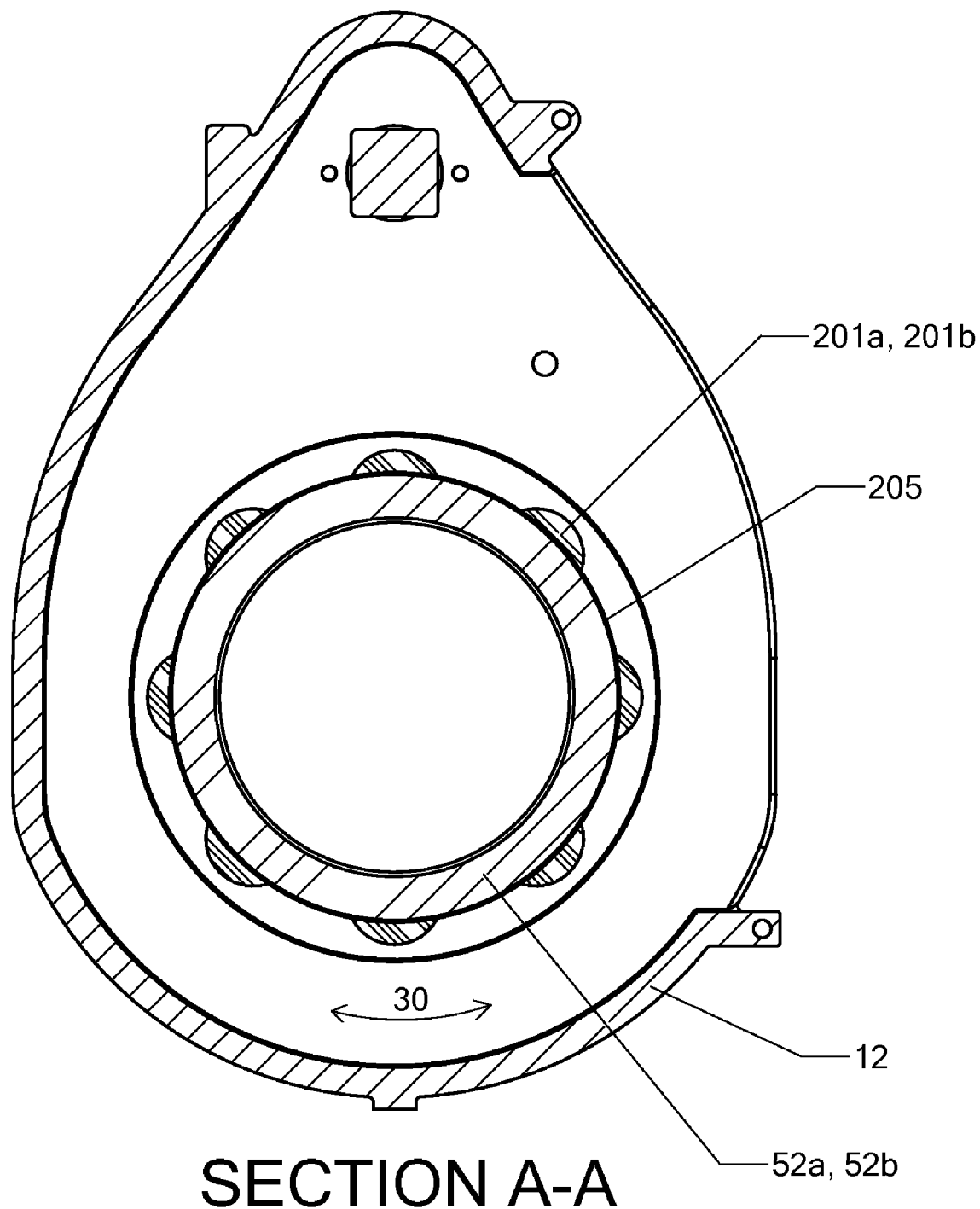
FIG. 2 is a section view along axis A-A of FIG. 1.
Figure 3:
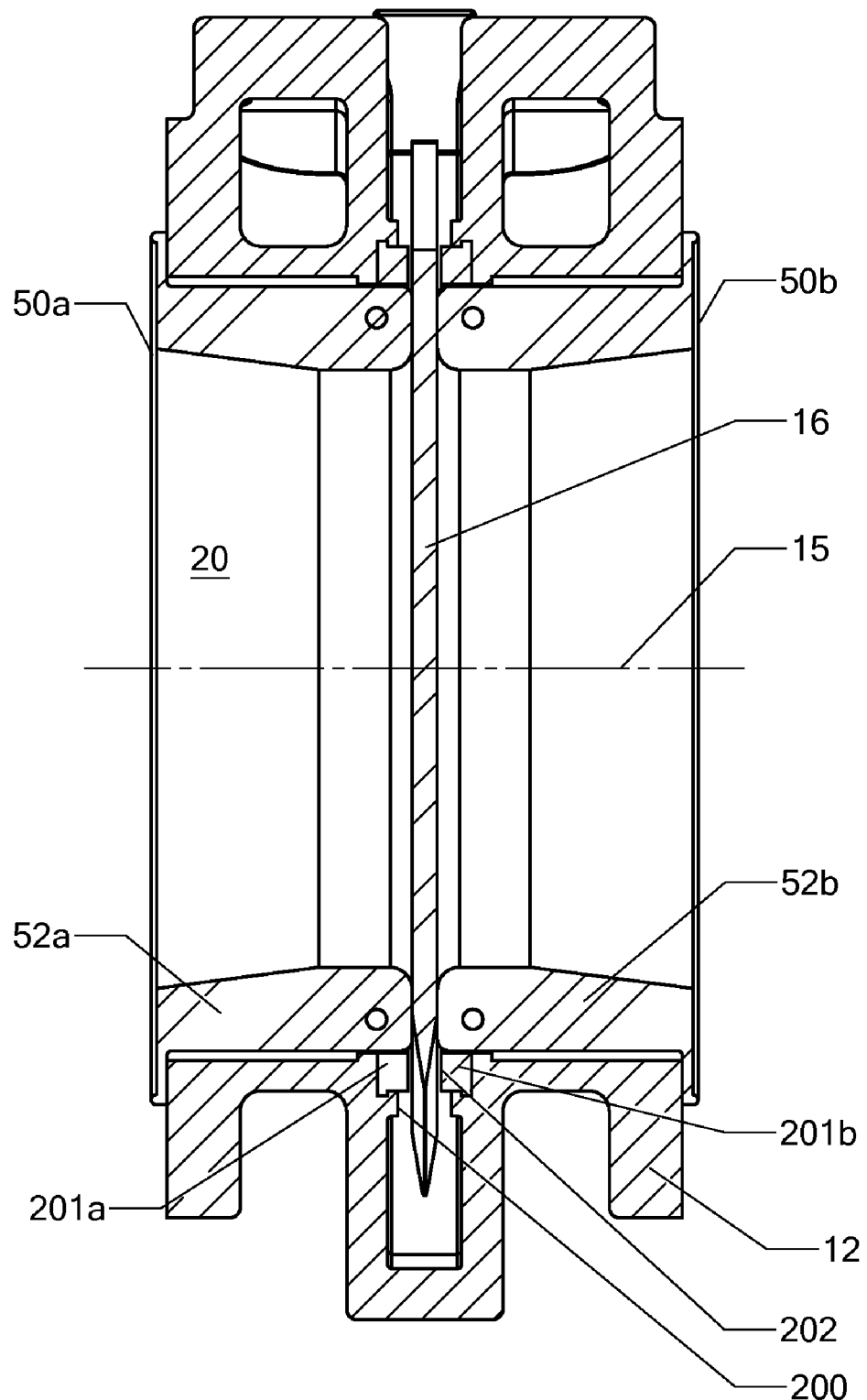
FIG. 3 is a section view along axis B-B of FIG. 1.
Figure 8:
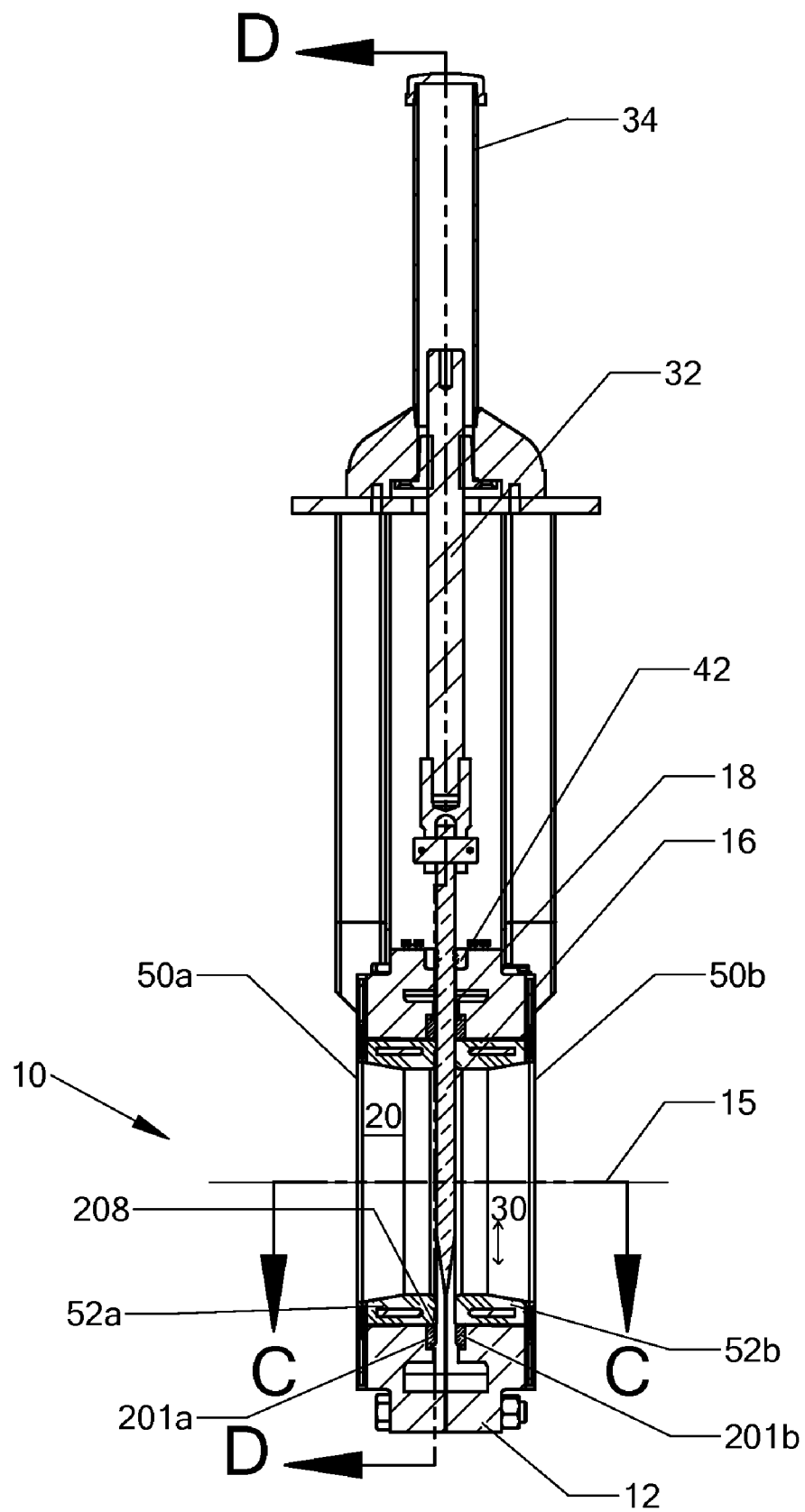
FIG. 8 is a section view of a linear gate valve employing a support member of the present invention.
Figure 9:
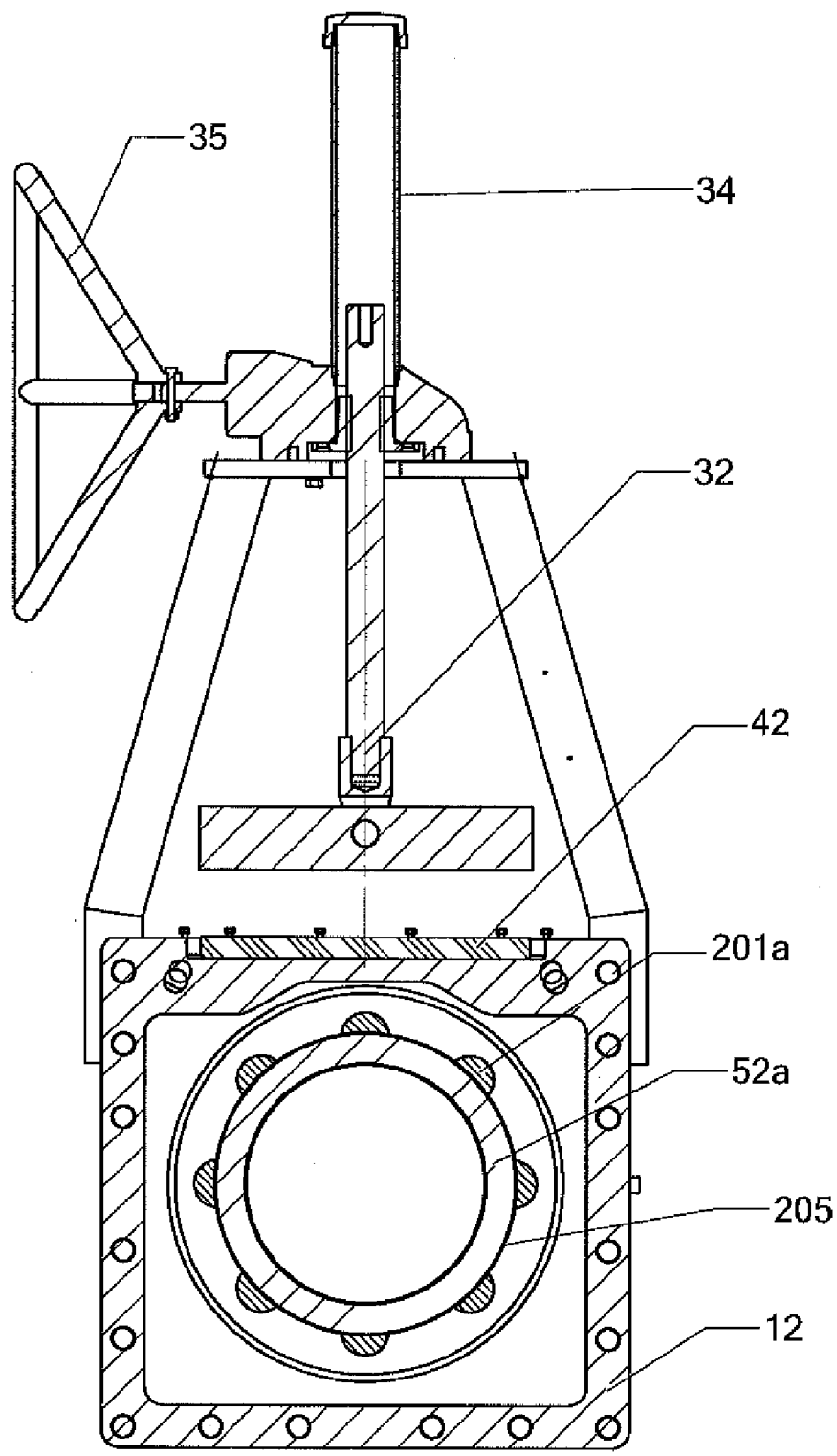
FIG. 9 is a section view along axis D-D of FIG. 8.
Figure 10:
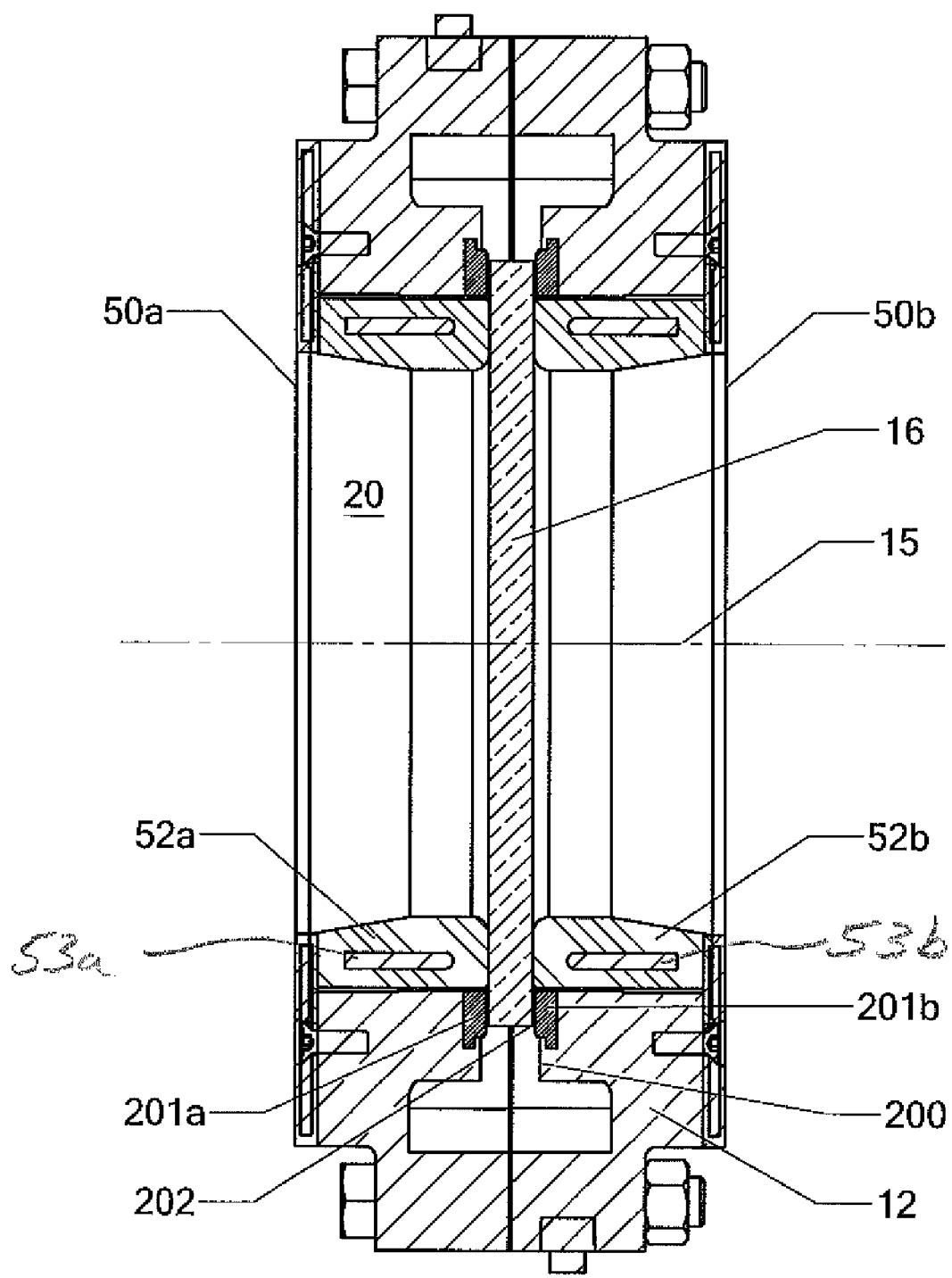
FIG. 10 is a section view along axis C-C of FIG. 8.

With reference to the figures, FIGS. 1, 2, and 3 show a rotary gate valve 10, and FIGS. 8, 9 and 10 show a linear gate valve 10, each having a main body structure 12 positioned between a pair of axially aligned conduits, not shown, for carrying a fluid or slurry along an axis 15, shown in FIGS. 1, 3, 8 and 10. As seen in FIGS. 1 and 8, a flat, fluid-impermeable gate 16 is positioned within a slot 18 passing through main body structure 12.

In both the rotary gate and linear gate valve 10, gate 16 is slidable through slot 18 to selectively occlude an interior region or passage 20 of gate valve 10. Passage, or passageway, 20 extends within the main body structure 12 to permit fluid flow therethrough. Occlusion of passage 20 with gate 16 functions to close valve 10. Removing gate 16 from passage 20 functions to open gate valve 10. Gate 16 is rotate through slot 18 within the bidirectional valve 20, shown in FIG. 2, and slideable in directions 30 that are transverse, preferably perpendicular, to axis 15 within the linear knife gate valve, shown in FIG. 8. For example, movement of gate 16 through slot 18 within the linear knife gate valve may be controlled by a conventional threaded stem positioned within an optional impermeable, resilient boot and cap, and coupled to handwheel unit, which are secured to an upper portion of main body structure 12. It will be appreciated that movement of gate 16 through slot 18 may be controlled by other conventional mechanisms such as, for example, pneumatic, hydraulic, or electromechanical mechanisms.

In one embodiment, the main body structure 12 includes a pair of opposed, substantially identical body halves that are welded or bolted together with a pair of flat spacers positioned between the sides thereof. In a second embodiment, the main body structure 12 includes a singular or unitary structure. Spacers may be integral to the body of the valve. Body halves may be fabricated or cast metal, preferably steel, or any other suitable material including composites. Spacers are formed of a rigid material, such as stainless steel or mild steel, that are selected according to the temperature and chemical characteristics of the slurry. Spacers separate body halves to form slot 18 through which gate 16 is movable to selectively open or close gate valve 10.

Figure 4:
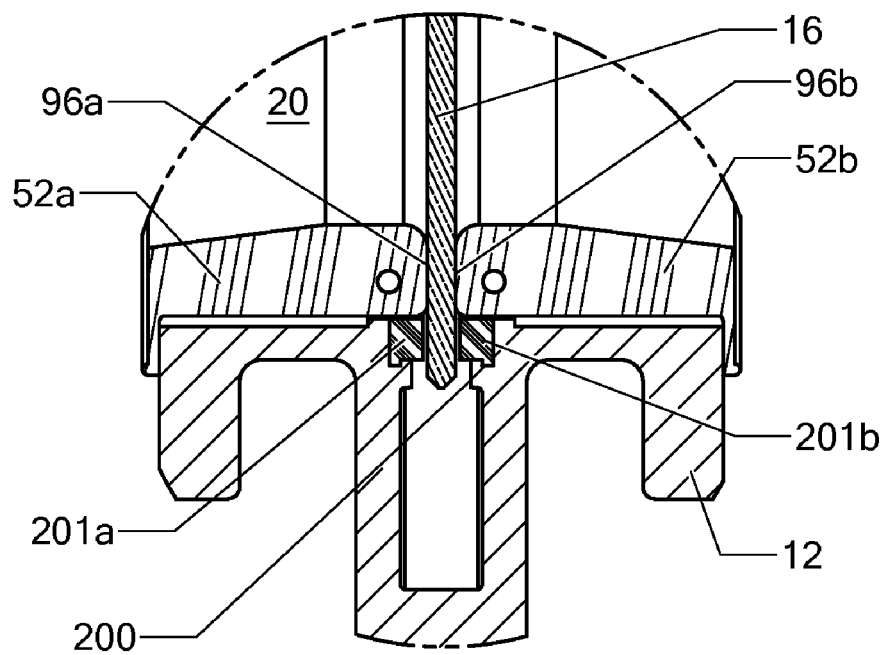
FIG. 4 is a detailed view of DETAIL K section view along axis B-B of FIG. 1.
Figure 5:
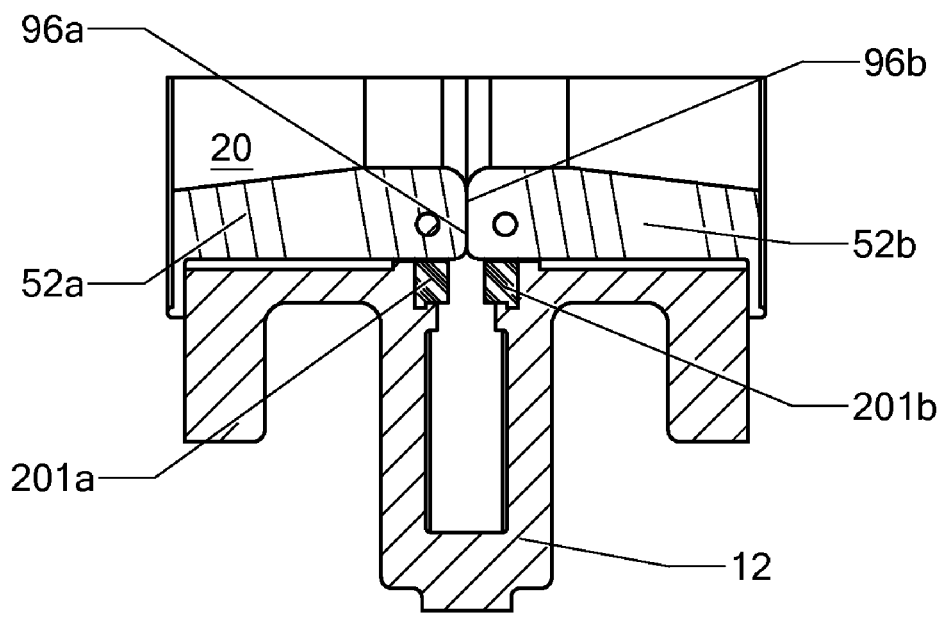
FIG. 5 is a second representation as shown in FIG. 4 with the valve gate in an open position.

A seal unit having substantially similar seal members is positioned within main body member 12 on opposite sides of the gate 16 that cooperate to seal gate valve 10 whether it is open or closed. Seal members are positioned and sized to provide valve 10 with full flow bore when it is completely open. The two seal members have substantially similar components. Seal members include resilient, annular, elastomer sleeves 52a and 52b. The elastomer sleeves 52a and 52b shown in FIGS. 1-5 and 8-10, are preferably formed of a molded soft, resilient material such as natural rubber, chlorobutyl, or neoprene with additives such as wax or Teflon™ included to improve lubricity. The hardness of elastomer sleeves 52a and 52b is a parameter that may affect valve performance. A sleeve of insufficient hardness may cause it to misalign at operating pressures and extrude out of valve body 12. It has been empirically determined that a sleeve of excessive hardness may not seal against gate 16 and thus take a compression set that would result in seal failure. For a preferred 8 inch (20 cm) diameter passage 20 of a valve 10, an elastomer sleeve with a hardness between approximately 48 and 70 durometer performs correctly at design pressures. The proper hardness of the elastomer sleeves may vary for valves having different passage diameters. Referring to FIG. 4, major lips 96a and 96b of respective sleeves 52a and 52b compress against peripheral margins on opposite sides of gate 16 whenever it occludes passage 20. Referring to FIG. 5, in the absence of gate 16, major lips 96a and 96b engage each other to seal passage 20 from atmosphere. Preferably, the valve 10 also includes a grease point to allow grease to be introduced into a chamber for lubricating elastomer sleeves 52a and 52b, to prolong sleeve life and facilitate ease of operation. In one embodiment, a hard wiper together with conventional packing material is positioned within upper portion of the body structure 12 and functions to seal grease within the chamber. Wiper also scrapes process media material from gate 16 as it slides through the wiper. The wiper may be formed of various materials according to the temperature and chemical characteristics of the slurry, such as polyethylene available as UHMW™ from Hoeshst Celanese of Chatham, N.J., Teflon™ (i.e., fluorinated ethylene propylene) available from Dupont, or of stainless steel of types 304 or 316. A clean-out area is connected to a drip pan that collects any fluid that might incidentally leak between gate 16 and seal units 50a and 50b. In an alternative embodiment, a solid member 42, shown in FIG. 8, may be affixed to the upper portion of the gate 16 to act as a barrier for compositions within the passage 20.

Gate 16 may be metal, plastic, or a composite material, with a taper 46 of 7°-12°, preferably 8°-10°, ground (i.e., for a metal plate) along both sides of leading edge 48. The angle of taper 46 on leading edge 48 of gate 16 is selected to be sufficiently large to prevent leading edge 48 from cutting elastomer sleeves 52a and 52b. The angle is sufficiently small to allow easy movement of gate 16 between sleeves 52a and 52b and to minimize leakage during movement of gate 16.

As shown in FIGS. 2-5, and 8-10, a set of a first and second rigid support members or segments 201a and 201b are affixed to the main body structure 12 at the periphery of the passage 20 on the first and second side of the gate 16. Generally, multiple sets of the first and second support members 201a and 201b are positioned around the periphery of the passage 20. As illustrated, for example, in FIG. 2, a representative number of sets of support member segments 201a and 201b may be disposed around the passage or opening within body structure 12 as described below. The number of support members employed and their respective positioning around the passage opening will depend on the particular application. Preferably the number of support member segments may, for example, range from about 2 to about 14, more preferably from about 4 to about 12, and most preferably from about 6 to about 10 sets. These rigid support members 201a and 201b extend from the main body structure 12 towards the transversal path of the gate 16, where the surface of the first and second rigid support members closest to the gate 16 extend beyond the surface of the main body structure 12. The rigid support members 201a and 201b are spaced along the internal diameter of the opening within the main body structure 12 and prevent, when under pressure on one side, from over-compressing the downstream elastomer sleeves 52a or 52b. As a result, leakage around the corresponding upstream one of seal units 50a and 50b is reduced and the durability of elastomer sleeves 52a and 52b is enhanced. In addition, the support members 201a and 201b provide sufficient directional support for gate 16 as the gate is displaced within the body structure 12. For example, in the linear gate valve 10 shown in FIGS. 8-10, the gate 16 may come in contact with the body 12 as it traverses between open and closed positions. In the case where gate 10 is metal, this results in metal to metal contact and may cause undesirable wear. The sets of support members 201a and 201b maintain the gate 16 in alignment preventing unwanted compression against valve body 12.

FIG. 4 illustrates gate 16 in a closed position in which the gate extends between elastomer sleeve 52a and 52b. As gate 16 traverses between the elastomer sleeves 52a and 52b, one of the support members 201a and 201b provides support for the downstream elastomer sleeve (52a or 52b) to prevent over-compression thereof. Also, the support members 201a and 201b also prevent the elastomer sleeves from bending into the passage as the gate passes the sleeves. FIG. 5 illustrates the valve 10 in an open position in which the gate 16 is lifted or rotated away from the elastomer sleeves 52a, 52b, When the gate 16 is open, the elastomer sleeves 52a and 52b form a seal to prevent process media from entering body structure 12.

Support members 201a and 201b may be formed of various materials according to the pressure and temperature, and generally include compositions having a temperature tolerance greater than the elastomeric sleeves, such as compositions of plastic, e.g., polyethylene available as UHMW™ from Hoeshst Celanese of Chatham, N.J., glass filled Teflon™ (i.e., fluorinated ethylene propylene) available from DuPont Company of Wilmington, Del., Ryton™ from Chevron Phillips Company LLC of Woodlands, Tex., and Delrin® from DuPont Company of Wilmington, Del. Preferably the support members include the plastic composition of Delrin® from DuPont Company of Wilmington, Del.

Figure 6:
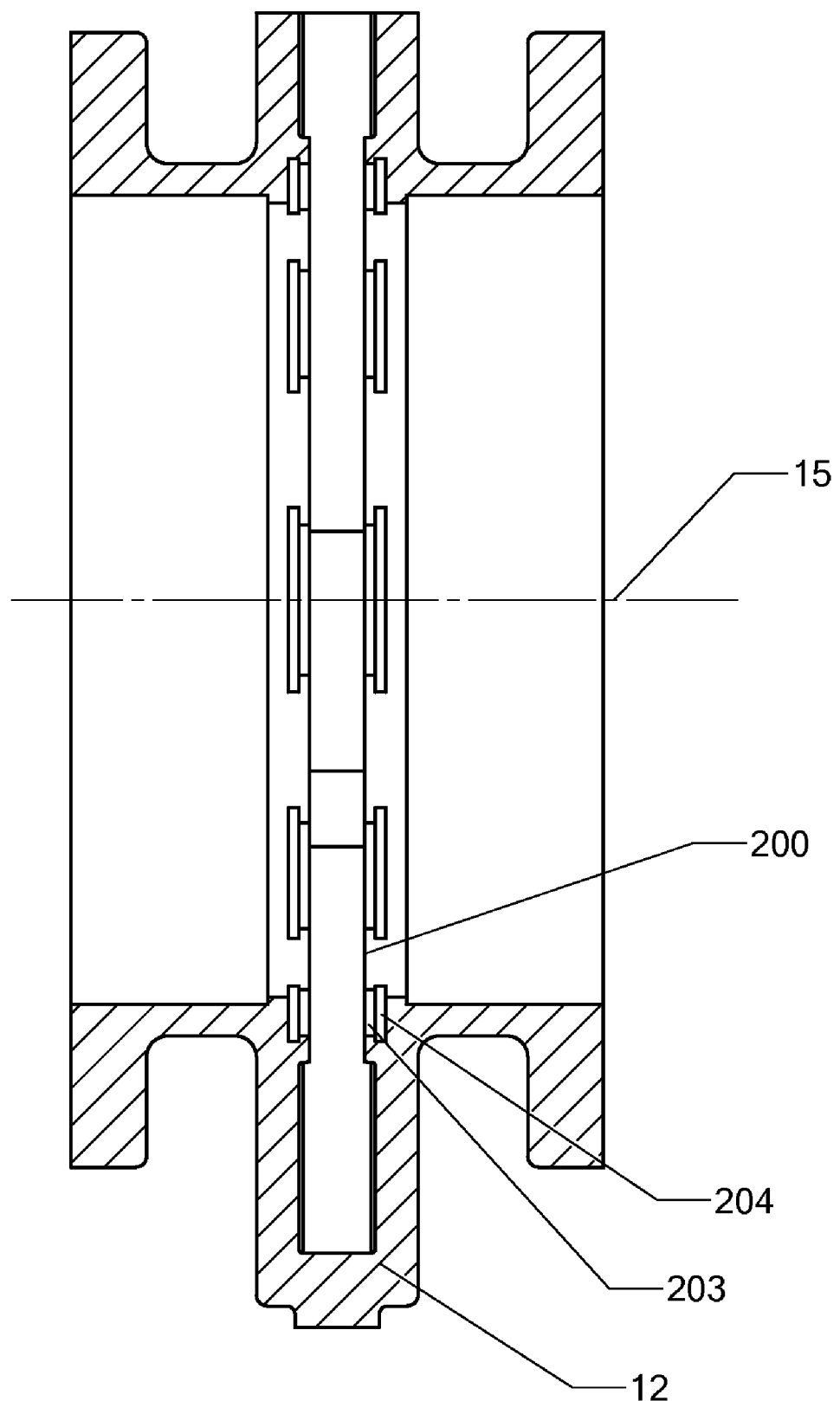
FIG. 6 is a section view of the main housing along axis B-B of FIG. 1.
Figure 7:
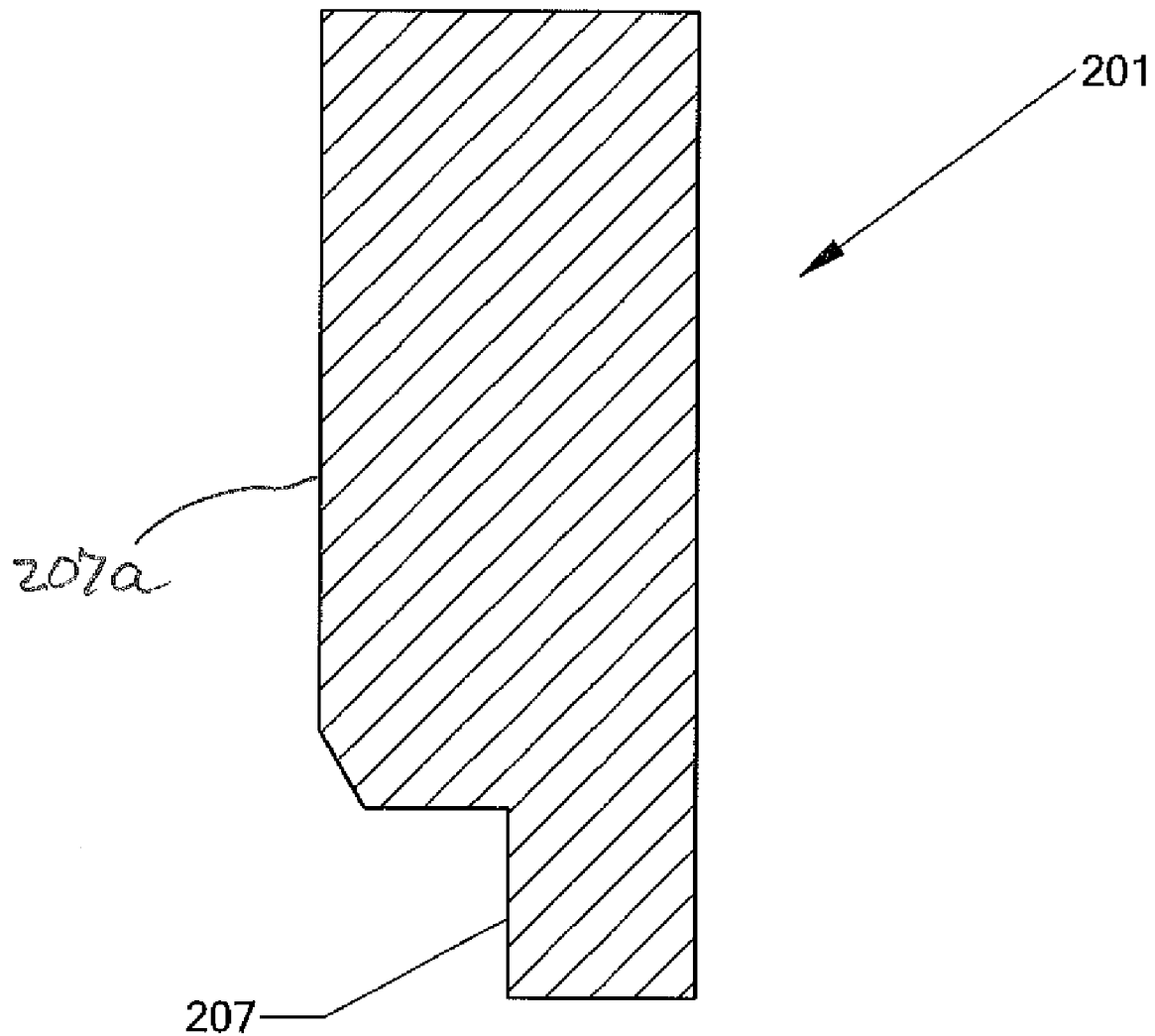
FIG. 7 is a side section view of a support member of the present invention.

FIG. 6 illustrates a recess for receiving support members 201a and 201b within body structure 12. The support members 201a and 201b are inserted into a recess in the periphery of the opening in the main body structure 12 defining the main through port or passage of valve 10. This may be done with proper body machining As such, the metal body halves are machined with a recess defined by pocket 203 and female slot 204 for each gate support member 201a and 201b. This pocket 203 and slot 204 are machined in the radial direction into the gate support face of each half of body structure 12. As mentioned previously, the support members 201a and 201b within the gate support face support the gate 16 in the axial direction while the gate 16 is under high differential pressure and when sleeves 52a and 52b are being over-compressed. The machining process creates a key or lip within the respective halves of body structure 12. This combination of pocket and slot could be considered a flattened "L" shape and is the axial locking mechanism for the support members 201a and 201b. An exemplary configuration of the support member 201 (201a, or 201b) is shown in FIG. 7. As can be seen, the support member 201 has a generally rectangular shape with an L" shaped portion 207. This configuration is disposed at least partially within the pocket 203 and slot 204 to retain the respective support member within body structure 12. In particular, the lower portion 207 is disposed in slot 204 and a front portion 207a extends partially into the passage. The majority of mass of the support member 201 may be disposed within the recess defined by the pocket 203 and slot 204 configuration such that the support member can withstand the compressive forces from gate 16 on sleeves 52a and 52b. Of course, alternative recess and support member configurations may be employed in which the support member is retained at least partially within the recess while withstanding the associated forces during gate operation.

The support members 201a and 201b are machined with a matching male key or lip to lock the support axially within the body half, e.g., these could also be considered as having a flattened "L" shape. The dimensions of this key match those of the female slot within the metal body half. The support members 201a and 201b may then be installed into the machined metal body. At this point, the support members 201a and 201b are inserted and pressed into the female housing slots. No adhesive or fasteners are generally used at this time to hold the support members 201a and 201b within the valve body. In one alternative embodiment, an adhesive or fastener may be used. Once installed, the support members 201a and 201b are prevented from moving axially in the main body structure 12 due the keyed slots in the metal housing. The support members 201a and 201b are then radially retained. Once the two valve sleeves 52a and 52b are installed into the main body structure 12, the gate support members 201a and 201b are retained in the radial direction. For example, as shown in FIG. 1, physical contact 208 of the outside diameter of sleeves 52a and 52b locks the inside radius of each support member 201 a and 201b into place in the main body structure 12.

The segmented design of these gate support members 201a and 201b provides two significant features. First, the segmented design allows these support members 201a and 201b to be installed in the radial direction into the main body structure 12. Second, the segmented designs keep slurry from building up a ridge that would be created by non-segmented surface. This minimizes build-up of slurry on the gate face and within the body cavities as the valve 10 actuates.

The lower coefficient of friction of the support members 201a and 201b reduces drag and corresponding valve thrust and torque requirements. The valve gate 16 will slide easier against the support members 201a and 201b than against the main body structure 12 when the valve 10 is pressurized. This resulting lower amount of drag will reduce the requirements for the valve actuator, which can then be down-sized. The reduction of contact between the gate 16 and metal body half will reduce wear on the body and gate 16.

FIG. 8 is a cross sectional view of a linear gate valve 10 with elastomer sleeves 52a and 52b disposed in respective halves of body structure 12. The support members 201a and 201b are installed on both sides of the gate 16 to provide support for the gate 16 in both directions and allow the knife gate valve 10 to be bi-directional. The support members 201 a and 201b also reduce compression on the sleeves 52a and 52b to improve their wear properties and sealing capabilities. This allows the sleeves 52a and 52b to perform better at sealing since the amount of compression on the sleeves 52a and 52b is controlled. FIG. 9 is a cross sectional view of the gate valve 10 shown in FIG. 8 taken along lines D-D illustrating the positioning of the support member segments 201a. As can be seen, the support segments 201a are radially disposed around the flow passage of valve 10 contiguous with elastomer sleeve 52a. The number and placement of the support members 201 a depending on the particular application and need for support of the elastomer sleeve 52a. FIG. 10 is a cross sectional view of the gate valve 10 shown in FIG. 8 taken along lines C-C illustrating the placement of the support members 201a and 201b within respective recesses of body structure 12. The support members 201a and 201b engage the edges of gate 16 which extend beyond elastomer sleeves 52a, 52b. Each of the sleeves 52a, 52b may include supports 53a, 53b to provide added structural support to the sleeves.

EXAMPLE 1

A rotary gate valve, having an eight inch (8 in) opening. Eight support members on one side of the gate were made of UHMW™ having a surface area of 0.62 square inches of surface area on one side, resulting in a total surface area of approximate 5 square inches adjacent to the gate.

EXAMPLE 2

A rotary gate valve, having an eight inch (8 in) opening was configured. Eight support members on one side of the gate were made of PTFE having a surface area of 0.62 square inches of surface area on one side, resulting in a total surface area of approximate 5 square inches adjacent to the gate.

EXAMPLE 3

A 14 inch version of the Clarkson linear-actuated knife gate valve was configured with the present invention. The support members were made of UHMW™. The valve was configured with a quantity of four gate supports on each side of the gate. Each support member had a surface area (adjacent to the gate) of approximately 10 square inches, with a total of approximately 36 square inches per side adjacent to the gate.

Analysis revealed that yield strength of the compositions resulted in the UHMW™ deforming less than the PTFE. Ryton™ deformed the least. As such, a greater surface area of PTFE is needed than the other two compositions, with more PTFE surface area needed than for the Ryton™.

It will be obvious to those having skill in the art that many changes may be made in the above-described details of a preferred embodiment of the present invention without departing from the underlying principles thereof. The scope of the invention should, therefore, be determined only by the following claims.

What is claimed is:

1. A gate valve, comprising:
   a main body structure with first and second sides defining a passage therethrough;
   a gate transversably positioned within the passage, suitable for occluding media flow therethrough, wherein the gate when positioned within the passage defines opposing sides, each of said sides having a peripheral margin;
   first and second elastomer sleeves disposed within the passage defined by said first and second sides, each elastomer sleeve having a continuous lip section, the lip sections of the first and second sleeves engaging the peripheral margins of the gate when it occludes the passage and engaging each other otherwise;
   a first plurality of rigid support segments affixed to the main body structure at the periphery of the passage on the first side of the gate, the first plurality of rigid support segments positioned radially around said first elastomer sleeve away from said passage and extending from the main body structure towards the transversal path of the gate; and
   a second plurality of support segments affixed to the main body structure at the periphery of the passage on the second side of the gate, the second plurality of rigid support segments positioned radially around said second elastomer sleeve away from said passage and extending from the main body structure towards the transversal path of the gate, wherein the surface of the second rigid support member closest to the gate extends beyond the surface of the main body structure.

2. The gate valve of claim 1 wherein a surface of each of the first plurality of rigid support segments closest to the gate extends beyond the surface of the main body structure.

3. The gate valve of claim 1 wherein a surface of each of the second plurality of rigid support segments closest to the gate extends beyond the surface of the main body structure.

4. The gate valve of claim 1 wherein the second plurality of rigid segments is mirrored to the first plurality of rigid support segments.

5. The gate valve of claim 1 wherein the first plurality of rigid segments are disposed non-continuously around said first elastomer sleeve sufficient to support said gate.

6. The gate valve of claim 1 wherein the second plurality of rigid segments are disposed non-continuously around said second elastomer sleeve sufficient to support said gate.

7. A gate valve, comprising:
   a main body structure with first and second sides defining a passage therethrough;
   a gate transversably positioned within the passage suitable for occluding media flow therethrough, wherein the gate when positioned within the passage defines a first and second peripheral margin;
   first and second elastomer sleeves disposed within the passage defined by said first and second sides, each elastomer sleeve having a continuous lip section, the lip sections of the first and second sleeves engaging the first and second peripheral margin of the gate when it occludes the passage and engaging each other otherwise;
   a first recess disposed within said first side of said main body structure, said first recess extending radially around said first elastomer sleeve;
   a second recess disposed within said second side of said main body structure, said second recess extending radially around said second elastomer sleeve;
   a plurality of first rigid supports non-continuously disposed around said passage within said first recess; and
   a plurality of second rigid supports non-continuously disposed around said passage within said second recess, said pluralities of first and second supports configured to reduce compression of said first and second elastomer sleeves when said gate engages said first and second sleeves.

8. The gate valve of claim 7 wherein said first recess is defined by a slot and a pocket configured to receive said first rigid support.

9. The gate valve of claim 7 wherein said second recess is defined by a slot and a pocket configured to receive said second rigid support.

10. The gate valve of claim 7 wherein said first recess defines an internal perimeter configured to receive said first rigid support.

11. The gate valve of claim 7 wherein said second recess defines an internal perimeter configured to receive said second rigid support.

12. A gate valve, comprising:
    a main body structure with first and second sides defining a passage therethrough;
    a gate transversably positioned within the passage suitable for occluding fluid flow therethrough, wherein the gate when positioned within the passage defines a first and second peripheral margin;
    first and second elastomer sleeves disposed within the passage defined by said first and second sides, each elastomer sleeve having a continuous lip section, the lip sections of the first and second sleeves engaging the first and second peripheral margin of the gate when it occludes the passage and engaging each other otherwise;
    a first recess disposed within said first side of said main body structure, said first recess extending radially around said first elastomer sleeve; a second recess disposed within said second side of said main body structure said second recess extending radially around said second elastomer sleeve;
    a plurality of first rigid supports each at least partially disposed within said first recess; and
    a plurality of second rigid supports at least partially disposed within said second recess, said first and second supports configured to prevent said gate from contacting said main body structure.

13. The gate valve of claim 12 wherein said first recess is defined by a slot and a pocket configured to receive said first rigid support.

14. The gate valve of claim 13 wherein said second recess is defined by a slot and a pocket configured to receive said second rigid support.

15. The gate valve of claim 13 wherein said plurality of first rigid supports are non-continuously disposed around said passage within said first recess.

16. The gate valve of claim 13 wherein said plurality of second rigid supports are non-continuously disposed around said passage within said second recess.

* * * * *